(12) United States Patent
Bruant

(10) Patent No.: US 6,484,773 B1
(45) Date of Patent: Nov. 26, 2002

(54) TREAD PATTERN WHICH REDUCES THE RUNNING NOISE OF A TIRE

(75) Inventor: Rémi Bruant, Riom (FR)

(73) Assignee: Michelin Recherche et Technique (CH)

( * ) Notice: Subject to any disclaimer, the term of this patent is extended or adjusted under 35 U.S.C. 154(b) by 80 days.

(21) Appl. No.: 09/604,643

(22) Filed: Jun. 27, 2000

(30) Foreign Application Priority Data

Jun. 28, 1999 (FR) .............................. 99 08280

(51) Int. Cl.$^7$ .................. B60C 1/00; B60C 11/117; B60C 11/12; B60C 107/00
(52) U.S. Cl. ................ 152/209.4; 152/209.5; 152/209.15; 152/209.17; 152/209.23; 152/DIG. 3
(58) Field of Search .................... 152/209.4, 209.5, 152/209.15, 209.18, 209.23, DIG. 3, 212, 209.17

(56) References Cited

U.S. PATENT DOCUMENTS

| | | | |
|---|---|---|---|
| 3,462,328 A | * | 8/1969 | Buckland |
| 5,176,765 A | * | 1/1993 | Yamaguchi et al. |
| 6,202,724 B1 | * | 3/2001 | Hiruma et al. |

FOREIGN PATENT DOCUMENTS

| | | | |
|---|---|---|---|
| DE | 3610662 | * | 10/1987 |
| EP | 0239719 | * | 10/1987 |
| EP | 0612631 | * | 8/1994 |
| EP | 780245 | * | 6/1997 |
| FR | 1506219 | * | 2/1968 |
| GB | 506142 | * | 6/1939 |
| GB | 2183205 | * | 6/1987 |
| JP | 60-209304 | * | 10/1985 |
| JP | 62-152906 | * | 7/1987 |
| JP | 62268709 | * | 11/1987 |
| JP | 5-162511 | * | 6/1993 |
| JP | 7-186633 | * | 7/1995 |
| WO | WO 98/35842 | * | 8/1998 |

* cited by examiner

Primary Examiner—Steven D. Maki
(74) Attorney, Agent, or Firm—Baker Botts LLP

(57) ABSTRACT

A tread pattern for a tire, the tread pattern being formed by elements in relief defined by grooves, some of these elements in relief being provided with at least one blind incision, that is to say, one which does not open into the grooves. These elements in relief include at least one cutout which opens into at least one groove defining these elements, and such that, on the running surface, each blind incision crosses at least one open-ended cutout of the same element, whatever the level of wear of the tire. Each of these open-ended incisions has a depth substantially equal to the depth of the blind incisions which it crosses and is filled with a filler material, the filler material having the characteristic of being gradually eliminated under the action of frictional contact with the ground during travel to form a channel of low depth which enables the air trapped in the blind incisions to escape.

20 Claims, 1 Drawing Sheet

TREAD PATTERN WHICH REDUCES THE RUNNING NOISE OF A TIRE

BACKGROUND OF INVENTION

The invention relates to the field of treads for tires, and in particular to treads, the elements in relief (blocks or ribs) of which are provided with incisions.

It is known to provide the tread of a tire, whether the latter be intended to be fitted on a passenger vehicle or on a heavy vehicle, with a tread pattern in order to obtain satisfactory adhesion performance, particularly on ground which has been made slippery by the presence of a liquid. A tread pattern comprises blocks (sections of rubber defined by grooves) and/or ribs (sections of rubber defined by two grooves extending substantially in the same direction) defined by grooves formed by molding into the thickness of the tread.

In order to improve the adhesion performance of a tread, it is known to use a large number of incisions made on the tread pattern elements either during the molding of said tread pattern or after molding and vulcanization of said tread.

"Groove" is understood to mean a cutout of an average width of at least 2 mm, and "incision" a cutout of lesser width, that is to say, of an average width of less than 2 mm. Depending on the desired effect, these cutouts are of greater or lesser depth relative to the thickness of the tread.

It is also known that although incisions made on an element in relief (rib or block) which open onto the edges of said element in relief—that is to say, which open into the grooves defining said element—promote flow of fluid towards these grooves, they result in a substantial reduction in the rigidity of the regions of the element in relief close to the edges of this element. The rigidity discussed here corresponds to the rigidity of deformation of the tread pattern element subjected to tangential forces exerted on its surface of contact with the ground.

In order to overcome this disadvantage, it was proposed to produce incisions which do not open onto the edges of the tread pattern elements (such incisions may be referred to as "blind" incisions).

Unfortunately, this arrangement results in an increase in the traveling noise of the tire equipped with a tread provided with such a tread pattern, given the presence of a volume of air trapped in the blind incisions, this increase being all the greater, the larger the number of incisions.

Japanese Patent Application published under No. 62-268709 proposes manufacturing a tire which when new comprises at least one incision of very low depth which crosses the trace of the blind incisions. Although this arrangement is advantageous when the tire is new, it disappears very rapidly as the tread becomes worn.

SUMMARY OF THE INVENTION

One object of the present invention is to propose a tread pattern which has excellent adhesion performance on slippery ground, that is to say, which is provided with a large number of ridges, and which does not have the disadvantages which have been set forth above.

In order to achieve the object set forth above, the invention proposes a tire tread, said tread being provided with a tread pattern formed by elements in relief defined by grooves. Furthermore, a plurality of the elements in relief are provided with blind incisions, that is to say, incisions which do not open onto the edges of said elements in the grooves.

The tread pattern element according to the invention furthermore comprises at least one cutout which opens onto at least one edge of the tread pattern element and which has a trace of average orientation such that, on the running surface, each blind incision crosses at least one open-ended cutout of the same element, whatever the level of wear of the tread. The tread pattern according to the invention is characterized in that each of the open-ended cutouts has a depth substantially equal to the depth of the blind incisions which it crosses and is filled with a filler material, said filler material having the property of mechanically connecting, at least when new, the walls of the filled cutout and wearing more rapidly than the material constituting the tread. Under the action of frictional contact with the ground during travel, the filler material is gradually eliminated to form a channel of a depth which is very low but, however, sufficient to enable part of the air trapped in the blind incisions to escape.

"Channel of low depth" is understood to mean a channel, the depth of which is of the order of magnitude of the width of the open-ended incision in question. "Cutout of depth substantially equal to the depth of the blind incisions" is to be understood to mean that this cutout has a depth equal to at least 80% of the depth of said blind incisions; it is also possible for the depth of the filled cutouts to be greater than the depth of the blind incisions which they cross.

Preferably, the width of the open-ended cutouts is at least equal to 1.5 times the width of the blind incisions which they cross, so as to have a satisfactory effect of evacuating the trapped air.

It is understood that, in order not to modify and lower the rigidity of the elements in relief of the tread pattern according to the invention, the open-ended cutouts are filled with a material which ensures a suitable mechanical connection of the opposing rubber walls defining said cutouts.

The tread pattern according to the invention has the advantage of having a large number of ridges formed by the grooves and blind incisions and also by the open-ended cutouts. The crossing of the blind incisions and of the open-ended incisions on one and the same tread pattern element, combined with a greater rate of wear for the material for filling the open-ended cutouts than for the tread pattern element has the effect of forming a channel for evacuating at least part of the air trapped in the blind incisions at the time of passing into the contact imprint of the tire with the ground. This is possible without the rigidity of the tread pattern being adversely affected thereby, and consequently without the wear performance being reduced.

Furthermore, since the open-ended cutouts have depths at least equal to 80% of the depth of the blind incisions, the mechanism described continues regularly during the entire useful life of the tire (and in particular until the wear limit of the tread is reached) and thus ensures the lasting desired traveling noise performance.

"Filler material" is to be understood to mean a material:
which provides a satisfactory mechanical connection between the opposing walls of the cutout in which it is present (at least initially in the use of the tire),
and which has a rate of frictional wear during travel which is greater than the rate of wear of the rubber mix forming the tread.

More generically, it is also advantageous to apply the teaching of the invention to a tread comprising elements in relief having at least one incision which opens only onto one edge of said element, for it has been noted that, under certain traveling conditions, the evacuation of the air included in this type of incision is not sufficient, and that this results in a significant increase in the noise level.

The characteristics and advantages of the invention will be better understood with reference to the variant embodiments described hereafter, accompanied by the drawings.

DESCRIPTION OF PREFERRED EMBODIMENTS

Figure 1:
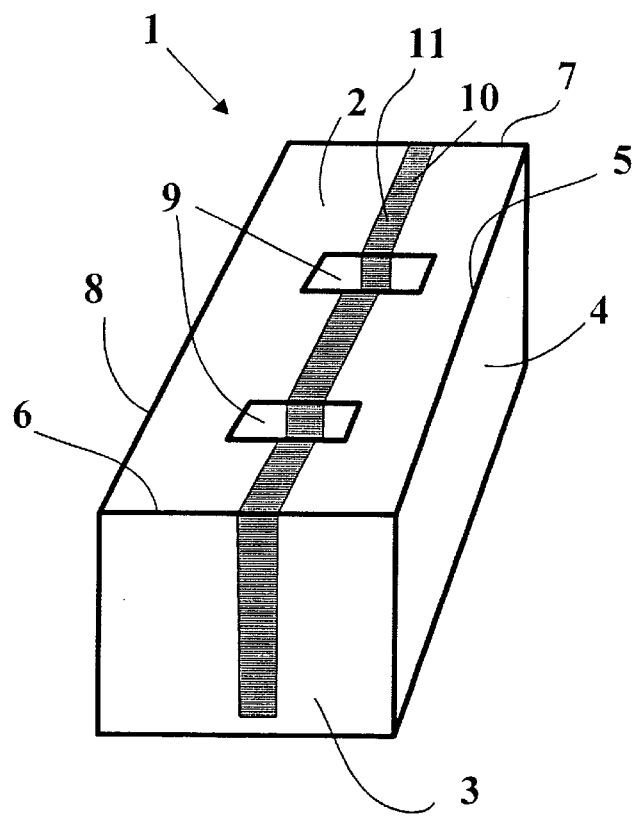
FIG. 1 shows, in perspective view, a block of a tread pattern of a tread according to the invention.

In FIG. 1, there can be seen a block 1 of a tread pattern for a tire; this block is in the form of a parallelepiped defined by four lateral faces (only two of these faces 3, 4 being visible in this figure) and an upper or outer face 2 corresponding to the face of the block which comes into contact with the ground during travel of the tire. The intersection of the lateral faces with the upper face forms ridges 5, 6, 7 8. This block comprises two blind incisions 9, that is to say, ones which do not intersect any of the ridges defining the upper face of the block 1, whatever the level of wear of said block. These two incisions 9 have rectilinear traces which are substantially parallel to each other and are of average orientation equal to the orientation of the ridges 6 and 7.

Furthermore, the block 1 comprises a cutout 10, the opposing walls of which are connected mechanically by a filler material 11 which completely occupies the volume of this cutout 10, said cutout 10 having an average trace at surface level which intersects the traces of the incisions 9, whatever the level of wear of the tread (the depth of the cutout 10, in the example illustrated, is equal to the depth of the blind incisions 9).

"Filler material 11" is understood to mean a material other than the rubber mix forming the block 1, having appropriate mechanical characteristics for mechanically connecting the opposing faces defining the incision 10, at least when new, and having lesser wear resistance during travel than the wear resistance of said mix.

By way of example, the filler material may be obtained from a rubber material in which "additives" having the function of increasing the wear rate by friction are incorporated. These additives may include:

- mineral compounds, such as, for example, fillers which are only slightly or not reinforcing, that is to say, fillers of very low fineness (object of a size greater than 1 micron): chalk, natural silicates (kaolin, talc, mica), crushed silica, alumina, fillers obtained by a chemical process (Mg, Al, Ca silicates, hydrated silico-aluminates, precipitated calcium carbonates), Ba sulfate, oxides (Mg, Zn, Al);
- organic compounds such as, for example, cut fibers, thermoplastics fibrils, biodegradable compounds (polyester amide, modified starch, chitin, chitosan, polylactic acid), cellulose derivatives (cellulose acetate, lignin);
- natural products such as bran residues, rice husks and any other derivative of the foodstuffs industry.

In the initial state (that is to say, after the block has been molded and before any travel), the filler material 11, as is the case in FIG. 1, may appear on the surface of the upper face 2 or alternatively be set back slightly relative to this surface.

Figure 2:
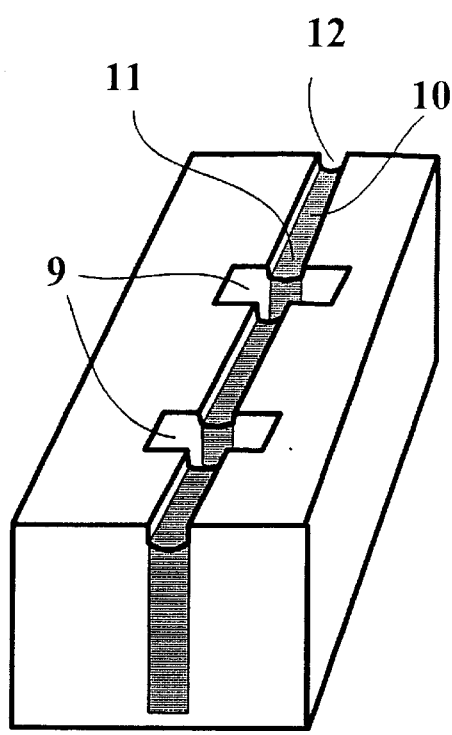
FIG. 2 shows, in perspective view, the block of FIG. 1 after a short distance of travel, showing differential wear.

During travel, the difference in wear rate between the filler material and the rubber mix forming the tread pattern block creates and maintains an offset between the two materials, as illustrated in FIG. 2.

FIG. 2 shows the block of FIG. 1 after partial wear resulting from travel and in which the filler material 11 of the cutout 10 is eliminated by wear over a low depth (a few tenths of a millimeter), forming a sort of channel 12 which causes the incisions 9 to communicate with the ridges 6 and 7 of the block 1. This channel 12 enables the air trapped in the blind incisions 9 to expand and escape partly during the phase of contact of the surface 2 of the block 1 with the ground during travel. This mechanism, which appears once differential wear has occurred (in fact from the first few kilometers traveled) carries on continuously and regularly during the entire duration of use of the tread provided with such a tread pattern block, which ensures the lasting traveling noise performance of a tread provided with elements in relief in accordance with the invention.

In one possible method of production, it is proposed first of all to form a non-vulcanized tread comprising a succession of strips of rubber mix and interleaves so as to form a laminated-type tread. This tread is then placed on a tire blank before molding said tire and forming the elements in relief and the various incisions. The interleaves arranged so as to open onto the running surface of the molded tire are made from a material which, after vulcanization, has lower wear resistance than that of the rubber mix of the tread.

The variant which has just been described is capable of being modified without departure from the principle of the invention; for example, the trace of the filled cutout 10 in the initial state may be of curved shape and/or be inclined relative to the direction perpendicular to the running surface. Provision may also be made for each blind incision to intersect a cutout filled with a filler material, said filled cutout opening solely onto one of the lateral faces of the block.

In order to improve the mechanical strength of the filler material within each filled cutout, it is advisable to provide for each cutout to follow a trace having at least one undulation or a zigzag trace in the direction of the thickness of the tread.

Of course, what has been described in the case of a tread pattern element in the form of a parallelepipedal block applies similarly to any other block of whatever shape, or alternatively to a rib; in this latter case, the cutouts filled with a filler material are intended to open into at least one of said grooves defining said rib.

Figure 3:
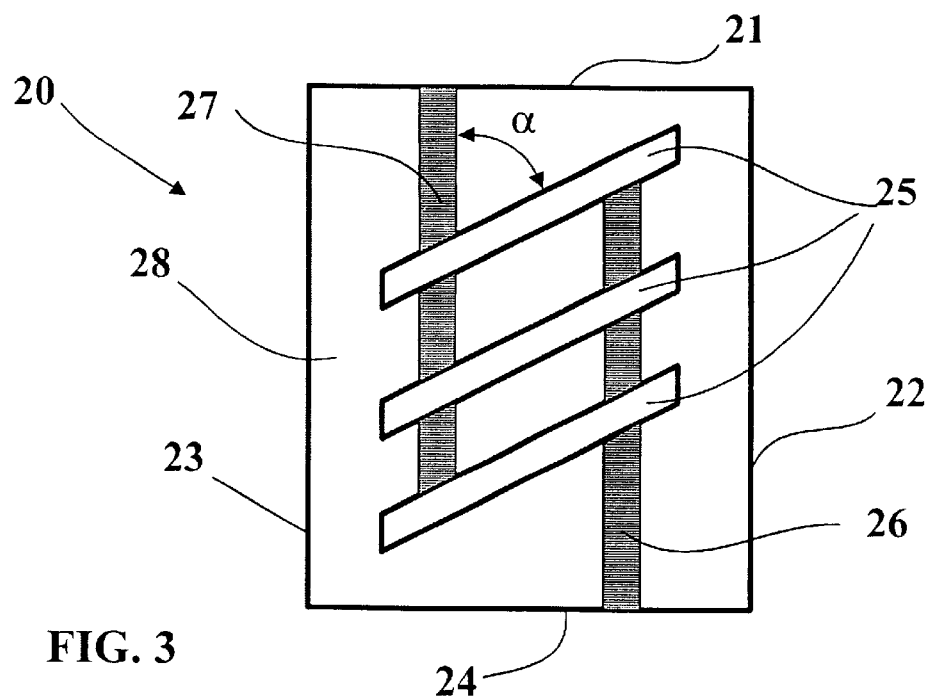
FIG. 3 shows, in plan view, a tread pattern block provided with three blind incisions according to the invention.

In FIG. 3, there is shown the upper face 28 of a tread pattern block 20, this face 28 being defined by four ridges 21, 22, 23, 24. Three incisions 25 of rectilinear trace which are parallel to each other open onto the face 28 without ever—whatever the level of wear—opening onto the ridges 21, 22, 23, 24. Complementarily, two rectilinear cutouts 26, 27 filled with a filler material intersect the blind incisions 25 and form an average angle cc therewith. Furthermore, the cutout 26 filled with a filler material opens onto only one lateral face of the block 20, and intersects the ridge 24, while the other cutout 27 opens only onto the opposite lateral face of the block 20 and intersects the ridge 21. These open-ended cutouts have depths which are equal to the depths of the blind incisions.

This configuration has the advantage of not reducing the rigidity of the block on the sides where the blind incisions are closest to the ridges, and therefore not causing irregular wear (that is to say, wear which is localized on certain ridges of the tread pattern block).

While remaining within the scope of the invention, it is possible to use a material which is in the form of a sheet as filler material, for example a sheet of paper, cardboard or of rubber mix, this sheet being provided with at least one orifice to allow the rubber mix of the tread to pass through and thus to permit the formation of at least one connecting bridge between the opposing faces of each incision which is filled by this filler material. In the case of a sheet of paper or cardboard, the latter may of course be treated to ensure minimal adhesion with the rubber mix of the tread.

In order to increase still further the effectiveness of the mechanical connection between the opposing faces of each filled cutout, the sheet serving for filling may comprise a plurality of orifices to allow the rubber mix to pass during the molding of the tread so as to form connecting bridges between the opposing walls defining said cutout.

Combined with any one of the variants described, provision may also be made on the running surface of the tread in the initial state for the presence of incisions of low depth which intersect the blind incisions. These incisions act as a channel for evacuating the air trapped in the blind incisions for the time necessary for the formation of at least one channel by wear of the filler material of the open-ended incisions filled with said material. These incisions, which are present when new, do not substantially modify the rigidity of the tread pattern, and disappear after partial wear of the tread after the first few kilometers of travel.

It is also conceivable to fill all the open-ended and blind incisions of one and the same tread pattern element of a tread with the same filler material which wears more rapidly than the mix forming said tread. Advantageously, the filler material for the open-ended incisions is different from the filler material for the blind incisions, the desired effect possibly being to obtain more rapid elimination, and in particular elimination more within the depth, of the filler material for the blind incisions for example under the action of humidity.

I claim:

1. A tire having a tread, said tread being provided with a tread pattern formed by elements in relief defined by grooves, these elements in relief having lateral faces and an outer face which is intended to come into contact with the ground during the travel of the tire, a plurality of elements in relief being provided with incisions which do not open onto at least one of the lateral faces of said elements, said tread being characterized in that each element in relief provided with at least one incision which opens at most onto only one of its lateral faces, comprises at least one cutout which opens onto at least one lateral face of the tread pattern element, this cutout being filled with a filler material, each incision opening at most onto only one of its lateral faces which crosses at least one filled cutout having substantially the same depth, and in that said material has the property of mechanically connecting, at least when new, the walls of the filled cutout and of wearing more rapidly than the material forming the tread so as to be eliminated gradually and regularly during travel by wear to form a channel for improving the evacuation of the air present in the incisions, and wherein the filler material is used in the form of a sheet comprising, across its thickness, at least one orifice for the rubber mix to pass through during molding of said tread in order to mold at least one mechanical connecting bridge connecting opposite faces of each filled cutout.

2. A tire according to claim 1, wherein the filler material is a rubber mix to which is added a mineral compound.

3. A tire according to claim 2, in which the mineral compound is a clear filler which is only slightly or not reinforcing.

4. A tire according to claim 2, in which the mineral compound is selected from the group consisting of chalk, natural silicates, crushed silica, alumina, a filler obtained by a chemical process, Ba sulfate, and Mg, Zn and Al oxides.

5. A tire according to claim 1, wherein the filler material is a rubber mix to which is added an organic compound selected from the group consisting of cut fibres, biodegradable thermoplastics fibrils, and cellulose derivatives.

6. A tire according to claim 1, wherein at least one cutout filled with a filler material follows a trace having at least one undulation or a zigzag trace in the direction of the thickness of said tread, so as to improve the mechanical strength of said material.

7. A tire having a tread, said tread being provided with a tread pattern formed by elements in relief defined by grooves, these elements in relief having lateral faces and an outer face which is intended to come into contact with the ground during the travel of the tire, a plurality of elements in relief being provided with incisions, at least one element in relief is provided with at least one blind incision which does not open onto any of the lateral faces of said elements, whatever the level of wear of said tread, each blind incision crossing at least one open-ended cutout which opens onto at least one lateral face of the tread pattern element, each open-ended cutout having a depth equal to at least 80% of the depth of the incision or incisions which it crosses, this cutout being filled with a filler material having the property of mechanically connecting, at least when new, the walls of the filled cutout and which wears more rapidly than the material constituting the tread so as to be eliminated gradually and regularly during travel by wear to form a channel for evacuating part of the air present in the incisions, and wherein the filler material is used in the form of a sheet comprising, across its thickness, at least one orifice for the rubber mix to pass through during molding of said tread in order to mold at least one mechanical connecting bridge connecting opposite faces of each filled cutout.

8. A tire according to claim 7, wherein the filler material is a rubber mix to which is added a mineral compound.

9. A tire according to claim 8, in which the mineral compound is a clear filler which is only slightly or not reinforcing.

10. A tire according to claim 8, in which the mineral compound is selected from the group consisting of chalk, natural silicates, crushed silica, alumina, a filler obtained by a chemical process, Ba sulfate, and Mg, Zn and Al oxides.

11. A tire according to claim 7, wherein the filler material is a rubber mix to which is added an organic compound selected from the group consisting of cut fibres, biodegradable thermoplastics fibrils, and cellulose derivatives.

12. A tire according to claim 7, wherein at least one cutout filled with a filler material follows a trace having at least one undulation or a zigzag trace in the direction of the thickness of said tread, so as to improve the mechanical strength of said material.

13. A tire according to claim 7, wherein the open-ended cutout which intersects at least one blind incision opens onto at least two lateral faces of the element in relief.

14. A tire according to claim 7, wherein the average width of each open-ended cutout is at least equal to 1.5 times the average width of the blind incisions.

15. A tire having a tread, said tread being provided with a tread pattern formed by elements in relief defined by grooves, these elements in relief having lateral faces and an outer face which is intended to come into contact with the ground during the travel of the tire, a plurality of elements in relief being provided with at least one blind incision which opens onto the outer face of said element but does not open onto any of the lateral faces of said elements, said at least one blind incision being delimited by two main lateral faces, each said element in relief having at least one blind incision being further provided with at least one cutout which opens onto at least one lateral face of said element and which crosses at least one lateral face of said at least one blind incision and has substantially the same depth as said at least one blind incision, said cutout being filled with a filler material, and said filler material having the property of mechanically connecting, at least when new, the walls of said at least one filled cutout and of wearing more rapidly than the material forming the tread so as to be eliminated gradually and regularly during travel by wear to form a channel for improving the evacuation of the air present in the incisions, and wherein the filler material is used in the form of a sheet comprising, across its thickness, at least one orifice for the rubber mix to pass through during molding of said tread in order to mold at least one mechanical connecting bridge connecting opposite faces of each filled cutout.

16. A tire according to claim 15, wherein the filler material is a rubber mix to which is added a mineral compound.

17. A tire according to claim 16, in which the mineral compound is a clear filler which is only slightly or not reinforcing.

18. A tire according to claim 16, in which the mineral compound is selected from the group consisting of chalk, natural silicates, crushed silica, alumina, a filler obtained by a chemical process, Ba sulfate, and Mg, Zn and Al oxides.

19. A tire according to claim 15, wherein the filler material is a rubber mix to which is added an organic compound selected from the group consisting of cut fibres, biodegradable thermoplastics fibrils, and cellulose derivatives.

20. A tire according to claim 15, wherein at least one cutout filled with a filler material follows a trace having at least one undulation or a zigzag trace in the direction of the thickness of said, tread, so as to improve the mechanical strength of said material.

* * * * *